United States Patent [19]
Tibbals, Jr.

[11] Patent Number: 4,688,592
[45] Date of Patent: Aug. 25, 1987

[54] EARTHQUAKE TREMOR RESPONSIVE SHUT OFF VALVE

[76] Inventor: Edward C. Tibbals, Jr., 2216 Guilford College Rd., Jamestown, N.C. 27282

[21] Appl. No.: 935,347

[22] Filed: Nov. 26, 1986

[51] Int. Cl.⁴ ............................................. F16K 17/36
[52] U.S. Cl. ......................................... 137/38; 251/66
[58] Field of Search ................ 137/38, 39, 45; 251/66

[56] References Cited

U.S. PATENT DOCUMENTS

| | | | |
|---|---|---|---|
| 3,802,459 | 4/1974 | Geraudie | 251/66 X |
| 4,513,763 | 4/1985 | Ware | 137/38 |
| 4,640,303 | 2/1987 | Greenberg | 137/38 |

Primary Examiner—Robert G. Nilson

[57] ABSTRACT

An earthquake tremor responsive valve closing assembly that includes a magnetically suspended pendulous weight adapted to be dropped upon a cocked trigger assembly for an internally spring biased gas line valve in response to a decrease in magnetic retention force resulting from tremor induced displacements.

9 Claims, 3 Drawing Figures

EARTHQUAKE TREMOR RESPONSIVE SHUT OFF VALVE

This invention relates to environment responsive valve closing apparatus and more particularly to an earthquake tremor responsive valve closing assembly for natural gas lines and the like.

In geographical areas subject to potential earthquake tremors at Richter scale levels that can cause substantial property damage, one of the greatest attendant hazards of an earthquake is the initiation and fueling of fires that result from broken or damaged fuel lines, such as gas lines or the like, in or adjacent to residential and commercial structures. Such fires not only contribute to further bodily harm and additional property damage, but also pose additional and continuing problems for rescue and repair services.

The need for inclusion of tremor responsive shut off valves for gas lines and the like has been long recognized. Among the expedients suggested by the art have been many types of mechanically balanced valve operators that are displaced by an earthquake tremor and displaced by gravity into a valve closing position. A more recent suggestion has been the employment of magnetic force for the temporary retention of a spherical closure member in valve open position and wherein a tremor operates, either directly or indirectly, to effect the release thereof with consequent permitted displacement into valve closing position. Indicative of such suggested use of magnetic retention forces are U.S. Pat. Nos. 3,783,887 and 4,382,449.

This invention may be briefly described as an improved construction for earthquake tremor responsive valve closing assemblies for natural gas or other fuel transmitting lines and which includes, in its broad aspects, a magnetically suspended pendulous weight adapted to be dropped onto a gas line valve trigger assembly in response to a decrease in magnetic retention force effected by relative transverse displacement of the pendulous weight induced by an earthquake tremor. In its narrower aspects the subect invention includes a magnetically suspended pendulum-like weight normally positioned in overlying spaced relation with a cocked trigger mechanism for a spring actuated gas line valve, and wherein a slight amount of lateral displacement of the valve assembly relative to the suspended weight effects a diminution of magnetic suspension force sufficient to permit the suspended weight to fall and actuate the valve trigger mechanism to effect a spring actuated valve closure.

Among the advantages of the subect invention is the provision of a simple and inexpensive earthquake responsive valve closing assembly that employs a standard gas line valve and operates in response to a tremor induced decrease in magnetic retention force and the law of gravity. Other advantages include the provision of a self contained earthquake tremor responsive valve closing assembly that operates independent of any external power source and which can be readily precalibrated to selectively respond to earthquake tremor magnitudes in excess of predetermined Richter scale values.

The object of this invention is the provision of an improved earthquake tremor responsive valve closing assembly for fuel transmitting conduits, such as natural gas lines and the like.

Other objects and advantages of the subject invention will become apparent from the following portions of this specification and from the appended drawings which illustrate, in accord with the mandate of the patent statute, a presently preferred construction for an earthquake tremor valve closing assembly that incorporates the principles of this invention.

Referring to the drawings.

Figure 1:
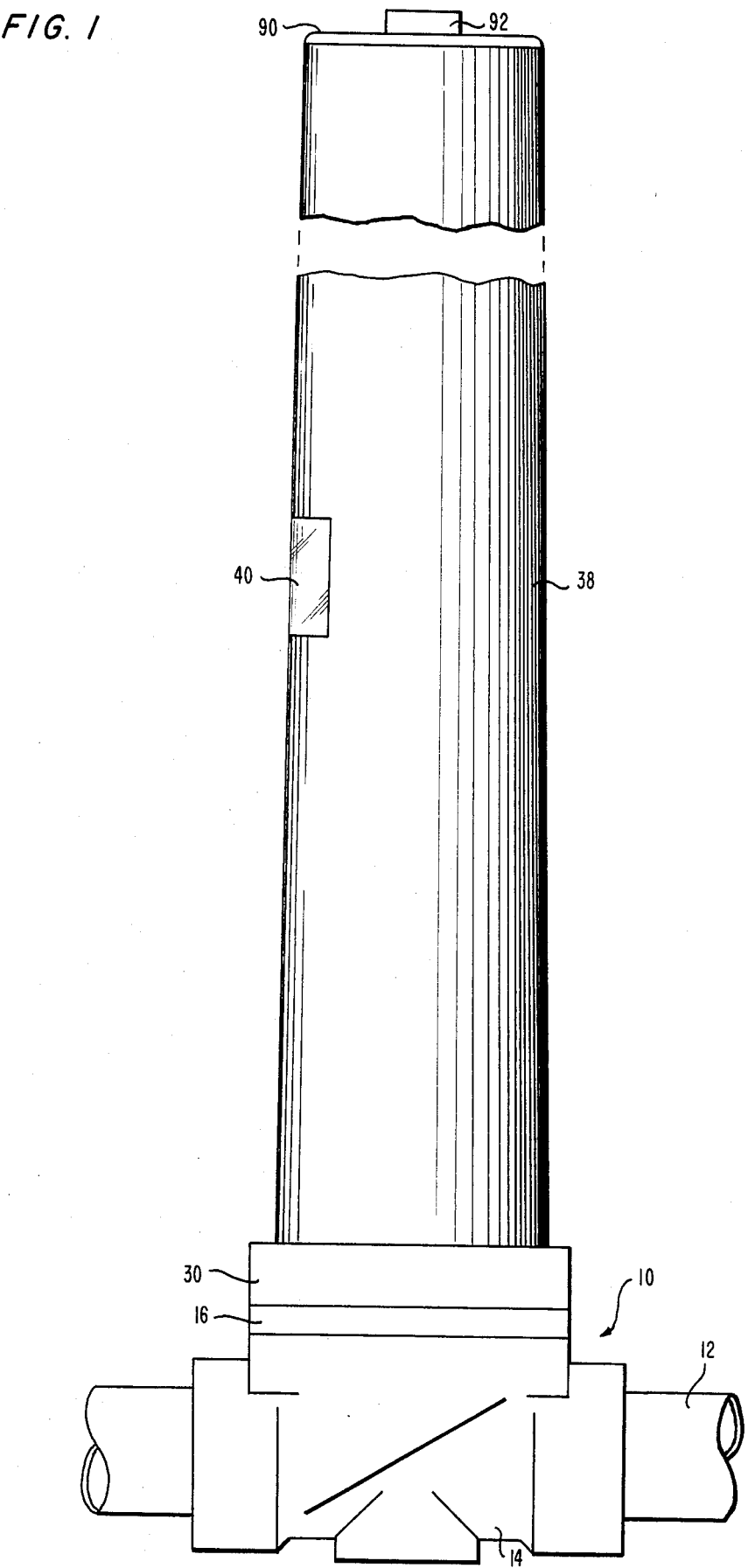
FIG. 1 is a side elevation of a valve closing assembly incorporating the principles of this invention.

Referring to the drawings, there is shown a conventional gas line valve 10, normally spring biased in the closed position, suitably a Model HV-216-585-1 valve as manufactured by Automatic Switch Co. (ASCO) of Florham Park, N.J., for inclusion in and control of flow through a gas line 12. Such gas line valve 10 conventionally includes a cast body portion 14 with an upwardly facing platform 16 from which extends a valve stem operator sleeve 18, a threaded section 20 and an extending valve steam 22. Such valve stem 22 is normally spring biased in the downward or closed position, as shown in FIG. 3, and wherein flow through the gas line 12 is blocked.

Mounted on the valve body platform 16 is a base plate 30 with an upwardly extending sleeve portion 32 surrounding the valve stem operator sleeve 18. The sleeve portion 32 is externally threaded, as at 36, for threaded interengagement of an upwardly extending tubular housing member 38, suitably having a window 40 therein to permit observation of component positioning therewithin.

Mounted on the upper end of the valve stem 22 and displaceable in conjunction therewith is a cap member 44 having an extending flange 46 at the upper end thereof. The lower end of the cap 44 terminates in an inclined frusto conical surface 48. Slideably mounted on the valve stem cap 44 is a trigger sleeve 50 shaped to define an internal annular ball containing recess 52 and an inwardly directed dependent flange 54. As shown, the upper surface 56 of the flange 54 is of downwardly sloping truncated conical configuration, as is the bore defining side wall 58 thereof. The bore defining side wall 58 is of a diameter greater than that of the threaded section 20 and is contoured to be of slightly greater diameter at its upper end than at its lower end of provide an inclined ball engaging surface. Upward displacement of the trigger sleeve 50 relative to the valve stem cap 44 is limited by a retainer ring 60.

Figure 2:
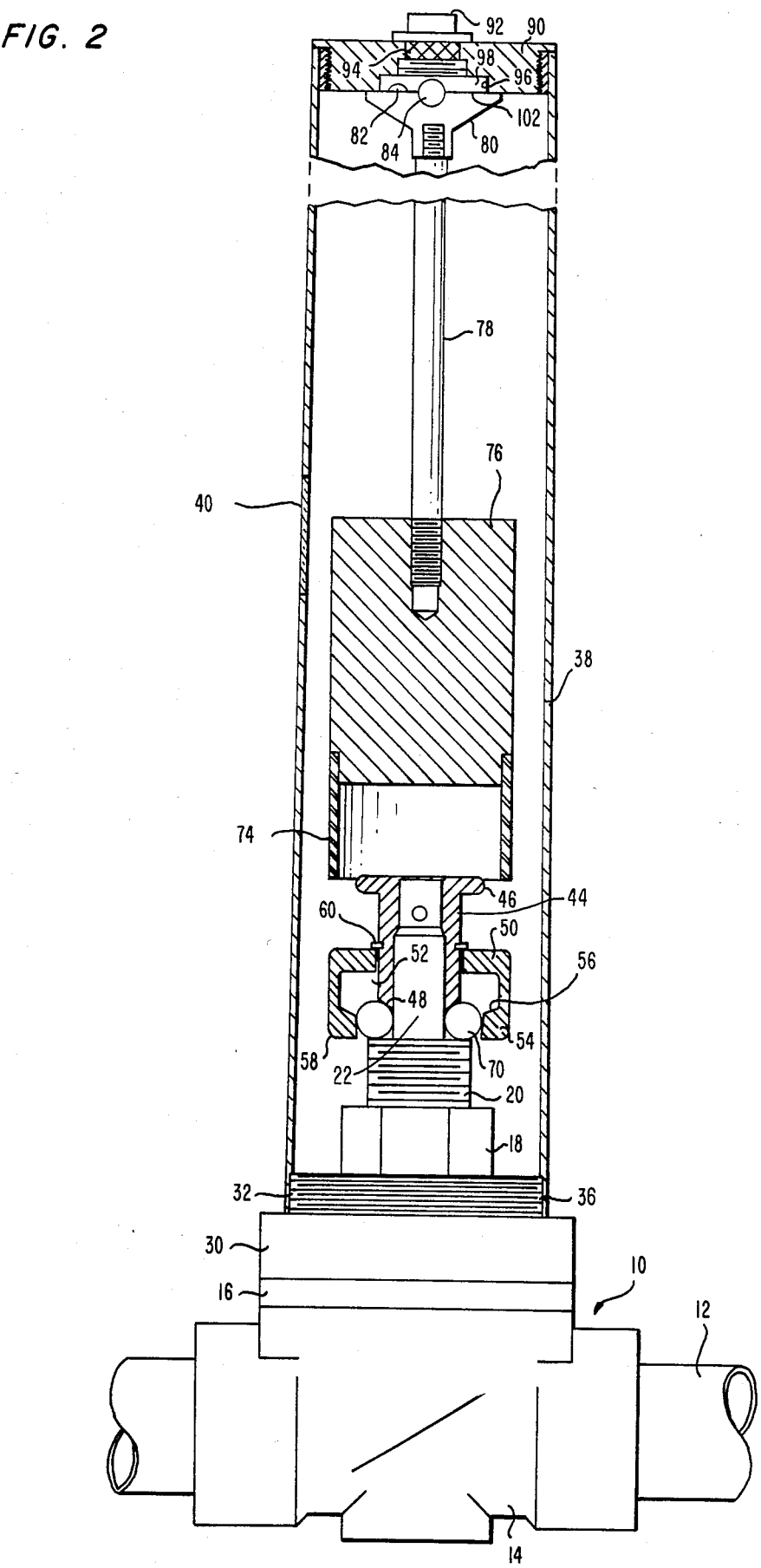
FIG. 2 is a vertical section showing the positioning of the component parts when the valve assembly is in its open condition.
Figure 3:
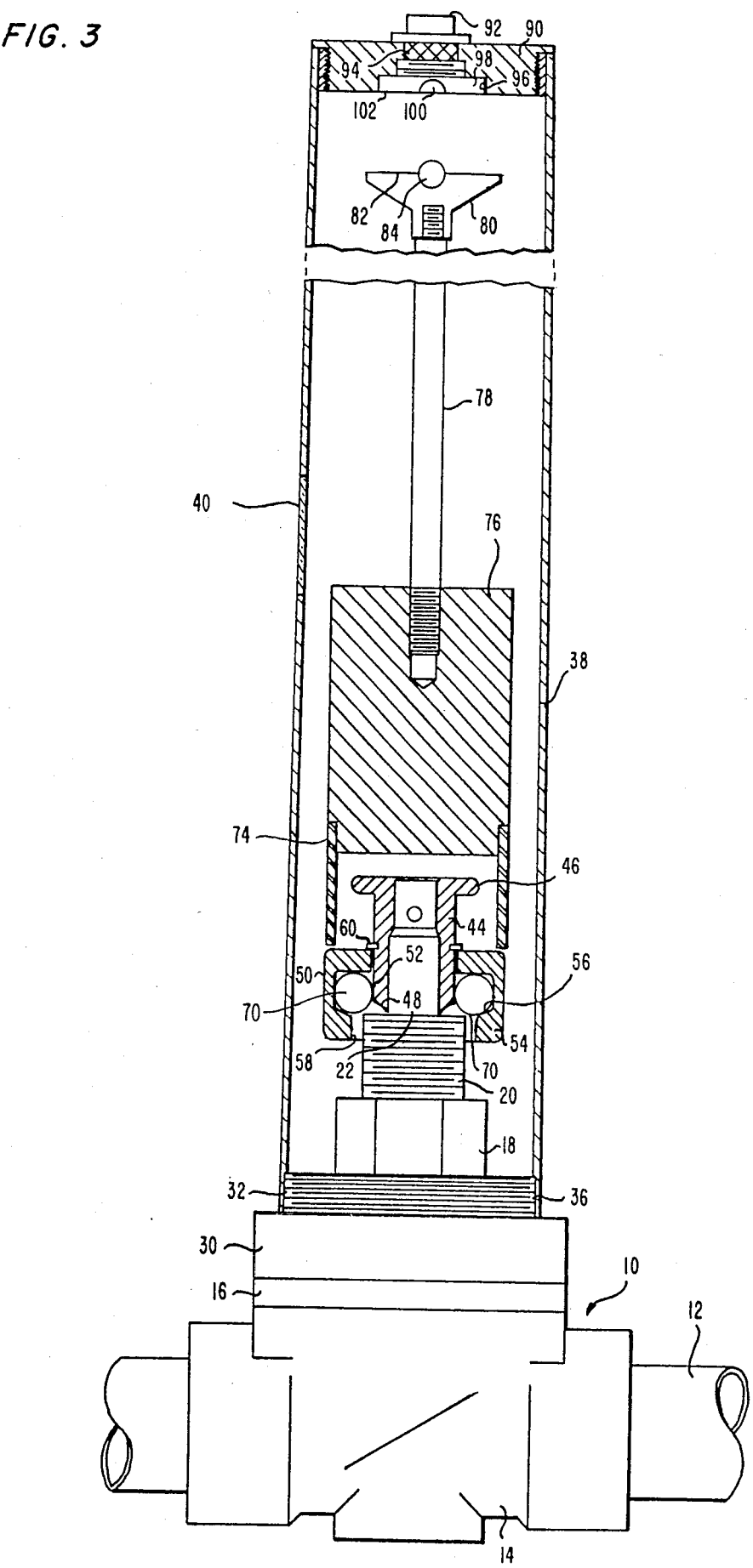
FIG. 3 is a vertical section similar to FIG. 2 but showing the positioning of the component parts when the valve assembly is in its closed condition.

As shown in FIG. 3 the valve stem 22 and cap 44 are shown in the lower or the normally spring biased valve closed position. When so located, the trigger sleeve 50 is in its lower or tripped position with a plurality of ball members 70 being disposed within the annular recess 52 and in facing relations against the surface of the lower portion of the cap member 44. When the valve stem cap 44 and valve stem 22 are lifted, against the action of the internal valve biasing spring, the dependent end of the cap 44 is elevated into spaced relation with the top of the threaded section 20, as shown in FIG. 2. When so elevated to a sufficient degree to permit the balls 70 to abut the valve stem 22, independent elevation of the trigger sleeve 50 to its limiting position against the retainer 60 results in disposition of the balls 70 in abutting engagement with the periphery of the valve stem 22 and the upper surface of the threaded section 20 and additionally disposed between the frusto conical surface 48 at the lower end of the cap 44 and the bore defining side wall 58 of the flange 54. As will be apparent, such positioning will result in retention of the valve stem 22, valve stem cap 44 and trigger sleeve 50 in the upper or cocked position, as shown in FIG. 2, until the trigger sleeve 50 is independently downwardly displaced a sufficient distance to permit the upper surface of the flange 54 to pass the horizontal diameter of the balls 70. At such time, the downward biasing action of the spring within the valve 10 will cause the balls 70 to be outwardly displaced out of engagement with frusto conical surface 48 at the dependent end of the cap 44 and to thereby permit the internal valve biasing spring to downwardly displace the valve stem 22 and valve stem cap 44 into the downward or closed position illustrated in FIG. 3.

As will now also be apparent, when the components are positioned in the cocked or valve open position, the balls 70 are being outwardly urged by the action of the surface 48 into compressive engagement with the bore defining side wall 58 of the dependent flange 54 of the trigger sleeve 50. Such compressive engagement, which can be regulated by the slope of such side wall 58, should be, at a minimum, just sufficient to prevent ball displacement but for practical operation will normally be somewhat higher than such minimal value, depending upon the degree of sensitivity desired.

Normally disposed in overlying spaced relation with the trigger sleeve 50 is the dependent end of an actuating sleeve 74 mounted on a suspended or pendulous weight 76. The weight 76 is mounted at the dependent end of an elongate moment arm 78. The upper end of the moment arm 78 is secured to a retention plate 80 formed of steel or other magnetic material that has a flat upper surface 82 with an axially located hemispherical ball 84 extending upwardly therefrom. As shown, such hemispherical ball may constitute the upper half of a spherical ball mounted in a recess in plate 80.

Mounted in the upper end of the elongate tubular housing 38 is a non ferrous screw-cap or closure 90 having a leveling bubble assembly 92 on the upper surface thereof. Axially mounted within the screw cap 90 is a permanent magnet 94, suitably a circular samarium—cobalt magnet, threadedly mounted therein to permit selective vertical positioning thereof. Positioning beneath the magnet 94, as within the bore 96 in the screw cap 90, is a paramagnetic spacer member 98 having an axially located hemispheric recess 100 on the planar lower surface 102 thereof.

As best shown in FIG. 2, the pendulous weight 76 is suspended by the interfacial engagement of the planar upper surface 82 and extending hemispheric ball 84 of the magnetic retention plate 80 with the planer lower surface 102 and hemispheric recess 100 respectively in the paramagnetic spacer member 98, as induced by the magnetic retention forces extant between the magnet 94 and the magnetic retention plate 80 and wherein the axis of magnetization is coaxial with the axis of the moment arm 78.

As will now be apparent, the pendulous weight 76 is positioned in overlying spaced relation with the sleeve member 50 of the valve trigger assembly by the magnetic retention forces attendant the above described interfacial engagement between the spacer member 98 and the magnetic retention plate 80. If the valve 10 and the housing 38 are shaken relative to the longitudinal axis of the moment arm 78, as by an earthquake tremor, the suspended weight 76, due both to gravity and inertia forces will try to remain stationary, thus causing a degree of separation of the normally complete interfacial engagement between spacer member 98 and magnetic retention plate 80. Since the mass of the pendulous weight 76 and its moment arm 78 is selected to be only slightly less than the maximum magnetic retention forces exertable by the magnet 94 and retention plate 80 and hemisphere 84 when such retention plate 80 and hemisphere 84 are in the closest proximity to the magnet 94, any degree of separation at the interface between retention plate 80 and spacer member 98 will reduce the amount of magnetic flux entering the ball 84 and retention plate 80 thereby reducing the force by which magnet 94 can support the gravitational forces associated with weight 76, moment arm 78 and retention plate 80. This latter assembly will, therefore, in the event of interface separation, drop to cause actuating sleeve 74 to hit trigger sleeve 50 forcing the latter to move downwardly relative to valve stem cap 44 and the balls 70. Such downward displacement of the trigger sleeve 50, as described in greater detail above, allows the balls 70 to move radially outward into the recess 52 thereby releasing the valve stem 22 for downward displacement by the action of the internal valve biasing spring 20 to close the valve 10 and halt the flow of gas through the line 12.

Having thus described my invention, I claim:

1. Apparatus for shutting off fuel lines in response to earthquake tremors of predetermined magnitude, comprising valve means includable in a fuel line normally spring biased into fuel line closing position;

means for cocking said valve means in fuel line open position including a trigger device displaceable from an elevated valve cocked position to a lower valve released position, a weight member suspended in overlying spaced relation with said trigger device for actuation of the latter in response to gravity induced displacement of said weight member, an elongate moment arm connected at its lower end said weight member, a permanent magnet mounted in remote spaced relation above said valve means and tremor displaceable in conjunction therewith, and means for magnetically suspending said moment arm and weight member in overlying spaced relation with said trigger device including a planar surfaced spacer plate positioned adjacent to said magnet and displaceable in conjunction therewith, a plate of magnetic material mounted at the upper end of said moment arm having a planar surface normally disposed in continuos interfacial engagement with the planar surface of said spacer plate by the magnetic retention force generated by said permanent magnet, whereby disruption of said continuous interfacial engagement intermediate the planar surfaces of said spacer plate and plate of magnetic material effected by tremor induced displacement of said permanent magnet and spacer bar relative to said suspended weight, moment arm and magnetic plate decreases said magnetic retention force and permits gravity induced displacement of said weight member to actuate said trigger device.

2. Apparatus as set forth in claim 1 wherein said permanent magnet and spacer member are mounted in a housing assembly extending from said valve means.

3. Apparatus as set forth in claim 1 wherein said plate of magnetic material has an axially located hemispherical projection extending from the planar surface thereof.

4. Apparatus as set forth in claim 3 wherein said spacer plate has an axial hemispherical recess in the planar surface thereof that accomodates said hemispherical projection extending from the planar surface of said plate of magnetic material.

5. Apparatus as set forth in claim 1 wherein said spacer plate is formed of paramagnetic material.

6. Apparatus as set forth in claim 1 wherein the spacing between said permanent magnet and said plate of magnetic material is adjustable.

7. Apparatus as set forth in claim 1 wherein said valve means includes an extending valve stem and said trigger means comprises a cap for said valve stem having a first camming surface at the lower end thereof, an independently displaceable hollow sleeve member surrounding said valve stem and cap having a ball containing recess and an inwardly directed dependent flange which has a second camming surface on the marginal edge thereof, and a plurality of balls disposable within said recess when in uncocked position and disposable intermediate said first and second camming surfaces when in cocked position.

8. Apparatus as set forth in claim 1 wherein the axis of magnetization of said permanent magnet is coaxial with the longitudinal axis of said elongate moment arm.

9. Apparatus for shutting off fuel lines in response to earthquake tremors of predetermined magnitude, comprising valve means having an extending valve stem includable in a fuel line normally spring biased into fuel line closing position, an elongate housing mounted on said valve means and extending vertically upward therefrom, means for cocking said valve means in fuel line open position including a trigger device associated with said valve stem displaceable from an elevated valve stem cocked position to a lower valve stem released position, a permanent magnet mounted in said housing in remote spaced relation above said valve means and trigger device a weight member suspended in overlying spaced relation with said trigger device for actuation of the latter in response to gravity induced displacement of said weight member, an elongate moment arm connected at its lower end to said weight member and having its longitudinal axis coaxial with the axis of magnetization of said permanent magnet, means for magnetically suspending said moment arm and weight member in overlying spaced relation with said trigger device including a planar surfaced spacer plate of paramagnetic material positioned adjacent to said magnet and displaceable in conjunction therewith, a plate of magnetic material mounted at the upper end of said moment arm having a planar surface normally disposed in continuous interfacial engagement with the planar surface of said spacer plate by the magnetic retention force generated by said permanent magnet, whereby disruption of said continuous interfacial engagement intermediate the planar surfaces of said spacer plate and plate of magnetic material effected by tremor induced displacement of said permanent magnet and spacer bar relative to said suspended weight, moment arm and magnetic plate decreases said magnetic retention force and permits gravity induced displacement of said wieght member to actuate said trigger device.

* * * * *